United States Patent [19]

Terada

[11] Patent Number: 5,148,299
[45] Date of Patent: Sep. 15, 1992

[54] LIQUID CRYSTAL DISPLAY DEVICE HAVING CONNECTING MEANS FOR CONNECTING THE TRANSPARENT ELECTRODE OF THE COMPENSATING CELL TO GROUND POTENTIAL FOR PREVENTING EXTERIOR STATIC ELECTRICITY

[75] Inventor: Toshiyuki Terada, Tokyo, Japan

[73] Assignee: Stanley Electric Co., Ltd., Tokyo, Japan

[21] Appl. No.: 744,429

[22] Filed: Aug. 13, 1991

[30] Foreign Application Priority Data

Aug. 20, 1990 [JP] Japan .................. 2-86861[U]

[51] Int. Cl.$^5$ .................................................. G02F 1/13
[52] U.S. Cl. .................................. 359/73; 359/53; 359/88
[58] Field of Search .............. 359/53, 73, 87, 88, 359/81, 84

[56] References Cited

U.S. PATENT DOCUMENTS

| | | | |
|---|---|---|---|
| 4,443,065 | 4/1984 | Funada et al. | 359/73 |
| 4,844,569 | 7/1989 | Wada et al. | 359/73 |
| 4,952,029 | 8/1990 | Hayashi et al. | 359/53 |
| 5,032,006 | 7/1991 | Grupp et al. | 359/88 |

FOREIGN PATENT DOCUMENTS

| | | | |
|---|---|---|---|
| 2-05827 | 8/1990 | Japan | 359/73 |
| 2-275416 | 11/1990 | Japan | 359/73 |
| 0011317 | 1/1991 | Japan | 359/73 |

*Primary Examiner*—Stanley D. Miller
*Assistant Examiner*—Huy K. Mai
*Attorney, Agent, or Firm*—Frishauf, Holtz, Goodman & Woodward

[57] ABSTRACT

A double-layered type super-twisted liquid crystal display device including a display cell and a compensating cell in a laminated structure with a spacer interposed therebetween wherein the compensating cell is arranged on the front surface side of the display device. The display cell is arranged on the rear surface side of the display device, and a light source for illuminating the display cell as well as a reflector are arranged on the rear surface side of the display cell. In addition, a transparent electrode is formed over the whole surface of at least one of glass substrates constituting the compensating cell. The transparent electrode is earthed via a clip pin which is held in a clamped state at the outermost end part of the transparent electrode.

4 Claims, 1 Drawing Sheet

LIQUID CRYSTAL DISPLAY DEVICE HAVING CONNECTING MEANS FOR CONNECTING THE TRANSPARENT ELECTRODE OF THE COMPENSATING CELL TO GROUND POTENTIAL FOR PREVENTING EXTERIOR STATIC ELECTRICITY

BACKGROUND OF THE INVENTION

1. Field Of The Invention

The present invention relates generally to a liquid crystal device. More particularly, the present invention relates to a double-layered type super-twisted nematic liquid crystal display device including a display cell and a compensating cell in a laminated state.

2. Description Of The Related Art

To facilitate understanding of the present invention, a typical conventional double-layered type super-twisted nematic liquid crystal display device will briefly be described below with reference to FIG. 3.

As shown in FIG. 3, the conventional display device is constructed such that a display cell 31 is superimposed on a compensating cell 3e in a layered structure with a spacer 33 interposed therebetween such that the display cell 31 is arranged on the front side of the display device. In addition, a light source 34 for illuminating the display cell 31 and a reflector 35 are arranged on the rear surface side of the compensating cell 32.

The display cell 31 is provided with a common transparent electrode and a segment transparent electrode both of which are electrically connected to one terminal of a driver circuit 36 at the right-hand end of a substrate as seen in the drawing.

Basically, since there is no need of feeding the compensating cell 32 with an electric current, any transparent electrode is not required for the compensating cell 32. In some case, however, a transparent electrode is formed over the whole surface of the substrate because of a necessity associated with a convenience of production.

With respect to the conventional liquid crystal display device constructed in the above-described manner, it has been found that erroneous display takes place under the influence of exterior static electricity, since the display cell is arranged on the front surface side of the display device. When the display device is used under an environmental circumstance having a lower temperature, it is necessary that the display cell 31 is warmed up in order to assure that any delay of a response speed is prevented reliably. However, as long as the compensating cell 32 is arranged on the light source 34 side, there appears a problem that it is practically difficult to positively utilize heat generated by the light source 34 for the purpose of warming up the display cell 31.

SUMMARY OF THE INVENTION

The present invention has been made in consideration of the foregoing problem.

Therefore, an object of the present invention is to provide a double-layered type super-twisted nematic liquid crystal display device which assures that an occurrence of erroneous display due to the influence induced by exterior static electricity is prevented reliably.

Another object of the present invention is to provide a double-layered type super-twisted nematic liquid crystal display device which assures that a property of display responsiveness under an environmental circumstance having a lower temperature is improved substantially.

The present invention provides a double-layered type super-twisted nematic liquid crystal display device including a display cell and a compensating cell in a laminated structure with a spacer interposed therebetween, wherein the compensating cell is arranged on the front surface side of the display device; the display cell is arranged on the rear surface side of the display device; a light source for illuminating the display cell as well as a reflector are arranged on the rear surface side of the display cell; and a transparent electrode is formed over the whole surface of at least one of glass substrates constituting the compensating cell, the transparent electrode being earthed.

The compensating cell is preferably constructed in a laminated structure such that an orientation film is formed on the inner surface of a glass substrate on the front surface side of the display device, the transparent electrode is formed on the inner surface of a glass substrate on the rear surface side of the display device and another orientation film is formed on the inner surface of the transparent electrode so that a liquid crystal is filled in the space defined by the glass substrates and the spacer.

The transparent electrode is earthed via a clip pin which is held in a clamped state on the outermost end part thereof projecting outside of the spacer while the transparent electrode and the glass substrate are clamped by the clip pin.

According to the present invention, since the compensating cell arranged on the front surface side of the display device is provided with the transparent electrode which is earthed via the clip pin, an occurrence of erroneous display due to the influence induced by exterior static electricity can be prevented reliably. In addition, with the display device of the present invention, it is easy to positively utilize heat generated by the light source for the purpose of warming up the display cell, a property of display responsiveness under an environmental circumstance having a lower temperature can be improved remarkably.

Other objects, features and advantages of the present invention will become apparent from reading of the following description which has been made in conjunction with the accompanying drawings.

DESCRIPTION OF THE PREFERRED EMBODIMENT

Figure 1:
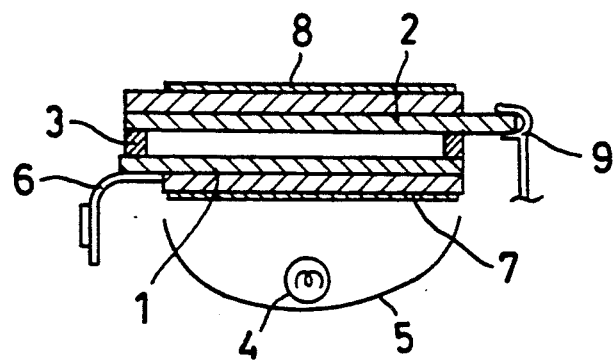
FIG. 1 is a sectional view of a double-layered type super-twisted nematic liquid crystal display device in accordance with an embodiment of the present invention, schematically illustrating a structure of the display device.

Now, the present invention will be described in detail hereinafter with reference to FIG. 1 and FIG. 2 which illustrate a preferred embodiment of the present invention.

As shown in the drawings, a double-layered type liquid crystal display device in accordance with the embodiment of the present invention is constructed such that a compensating cell 2 is superimposed on a display cell 1 in a laminated structure with a spacer 3 interposed therebetween and a light source 4 for illuminating the display cell 1 as well as a reflector 5 are arranged on the rear surface side of the display cell 1. It should be noted that the compensating cell 2 is arranged on the front surface side of the display device. One terminal of a driver circuit 6 is electrically connected to the left-hand end of the display cell 1 as seen in FIG. 1. In addition, a polarizing plate 7 is adhesively secured to the rear surface of the display cell 1, while another polarizing plate 8 is adhesively secured to the front surface of the compensating cell 2.

Figure 2:
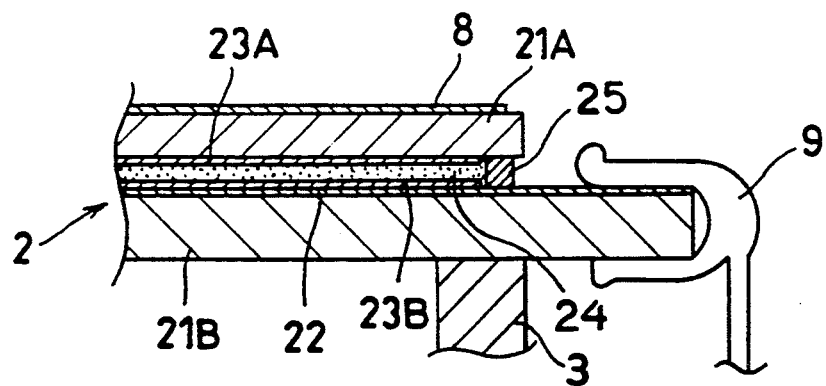
FIG. 2 is an enlarged fragmentary sectional view of the display device in FIG. 1, particularly illustrating the region in the proximity of one terminal of a compensating cell constituting the display device.
Figure 3:
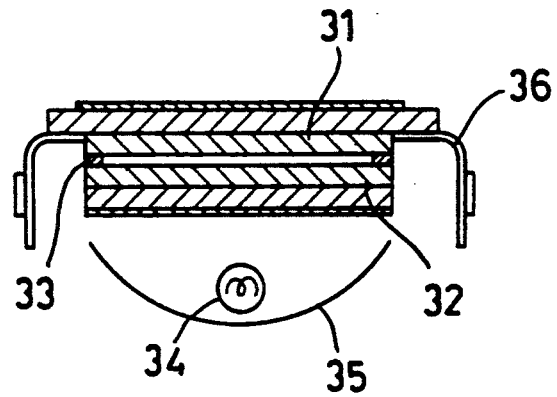
FIG. 3 is a sectional view of a conventional double-layered type super-twisted nematic liquid crystal display device, schematically illustrating a structure of the display device.

As best seen in FIG. 2, the compensating cell 2 is constructed such that a transparent electrode 22 is formed over the whole surface of one of glass substrates 21A and 21B each constituting the compensating cell 2, e.g., the glass substrate 21B located on the display cell 1 side, an orientation film 23A is formed on the inner surface of the glass substrate 21A and another orientation film 23B is formed on the inner surface of the transparent electrode 22 so that the space defined between the both orientation films 23A and 23B and the spacer 25 is filled with a liquid crystal 24. The right-hand end of the glass substrate 21B is held by a clip pin 9 in a clamped state so as to allow the transparent electrode 22 to be earthed or grounded via the clip pin 9.

With such construction, since the compensating cell 2 is arranged on the front surface side of the display device, and the transparent electrode 22 formed over the whole surface of the glass substrate 21B is earthed or grounded via the clip pin 9, the liquid crystal display device is not undesirably influenced by exterior static electricity, resulting in an occurrence of erroneous display due to the influence induced by the exterior static electricity being prevented reliably.

In addition, since the display cell 1 is arranged on the light source 4 side, this makes it easy to positively utilize heat generated by the light source 4 for the purpose of warming up the display cell 1. Warming-up of the display cell 1 in this way contributes to remarkable improvement of a property of display responsiveness under an environmental circumstance having a lower temperature.

It should be emphasized that the transparent electrode 22 in the compensating cell 2 is formed over the whole surface of at least one of the glass substrates 21A and 21B.

As is apparent from the above description, according to the present invention, the compensating cell is superimposed on the display cell in a laminated structure such that the compensating cell is arranged on the front surface side of the display device. This makes it easy to positively utilize heat generated by the illuminating light source for the purpose of warming up the display cell. Consequently, a property of display responsiveness of the display device under an environmental circumstance having a lower temperature can be improved remarkably. Additionally, since the transparent electrode is formed over the whole surface of at least one of the glass substrates and moreover it is earthed or grounded via the clip pin, an occurrence of erroneous display due to the influence induced by exterior static electricity can be prevented reliably.

While the present invention has been described above with respect to a single preferred embodiment thereof, it should of course be understood that the present invention should not be limited only to this embodiment but various changes or modifications may be made without departure from the scope of the invention as defined by the appended claims.

What is claimed is:

1. A double-layered type super-twisted nematic liquid crystal display device, comprising:
    a display cell;
    a compensating cell laminated on said display cell with a spacer interposed therebetween to define a space between said display cell and said compensating cell;
    said compensating cell comprising at least one glass substrate having opposed surfaces, and said compensating cell being arranged on a front surface side of said display device;
    said display cell being arranged on a rear surface side of said display device;
    illuminating means arranged on the rear surface side of said display cell for illuminating said display cell, said illuminating means comprising a light source and a reflector for reflecting light from said light source toward said display cell;
    a transparent electrode formed over the whole of at least one of said opposed surfaces of said at least one glass substrate of said compensating cell; and
    connecting means for connecting said transparent electrode to ground potential.

2. The liquid crystal display device of claim 1, wherein said connecting means for connecting said transparent electrode to ground potential comprises a clip pin clamped on an outermost end part of said transparent electrode and projecting outside of said spacer, said clip pin clamping together said transparent electrode and said at least one glass substrate on which said transparent electrode is formed.

3. The liquid crystal display device of claim 1, wherein:
    said at least one glass substrate of said compensating cell includes first and second glass substrates; and
    said compensating cell comprises a laminated structure which includes said first and second glass substrates, said first and second glass substrates being on outer and inner surface sides, respectively, of said display device, said laminated structure further including:
        a second spacer interposed between said first and second glass substrates to define a space between said first and second glass substrates;
        a first orientation film formed on an inner surface side of said first glass substrate;
        said transparent electrode being formed over the whole of an inner surface of said second glass substrate;
        a second orientation film formed on the inner surface side of said transparent electrode; and
        liquid crystal filled in said space defined between said first and second glass substrates by said second space which is interposed therebetween.

4. The liquid crystal display device of claim 3, wherein said connecting means for connecting said transparent electrode to ground potential comprises a clip pin clamped on an outermost end part of said transparent electrode and projecting outside of said first-mentioned spacer, said clip pin clamping together said transparent electrode and said second glass substrate on which said transparent electrode is formed.

* * * * *